(12) United States Patent
Hanyu (10) Patent No.: US 6,209,950 B1
(45) Date of Patent: Apr. 3, 2001

(54) VEHICLE BODY STRUCTURE

(75) Inventor: Atsushi Hanyu, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/660,397

(22) Filed: Sep. 12, 2000

(30) Foreign Application Priority Data

Sep. 17, 1999 (JP) .............................................. P11-264463

(51) Int. Cl.$^7$ .................................................. B62D 27/00
(52) U.S. Cl. ...................... 296/194; 296/203.03; 296/208
(58) Field of Search .................................. 296/194, 192, 296/203.02, 203.03, 208

(56) References Cited

U.S. PATENT DOCUMENTS

| | | | |
|---|---|---|---|
| 4,699,419 | * 10/1987 | Kawase et al. | 296/192 |
| 4,883,309 | * 11/1989 | Miyazaki et al. | 296/194 |
| 5,052,742 | * 10/1991 | Akoshima et al. | 296/192 |
| 5,332,277 | * 7/1994 | Enning et al. | 296/194 X |

FOREIGN PATENT DOCUMENTS 6-329051    11/1994   (JP) .

* cited by examiner

Primary Examiner—Joseph D. Pape
(74) Attorney, Agent, or Firm—McDermott, Will & Emery (57) ABSTRACT

A vehicle body structure is provided to transmit a suspension input to framework members of a vehicle effectively. The vehicle body structure includes an air box 1, front-pillar inner members 7 on both sides of the air box 1, front-pillar outer members 9 and hood ridges 11. Each hood ridge 11 has a upper hood ridge member 41 formed to extend along a fore-and-aft direction of the vehicle. The front-pillar inner member 7 has a pillar-inner vertical wall 17 along the fore-and-aft direction of the vehicle, an air-box socket 19 and an air-box joint flange 21 for connection with the air box 1. The upper hood ridge member 41 has a vertical wall 41c formed with an opening 41e and a width-directional vertical wall 41f formed at a rear part of the member 41. The front-pillar outer member 9 has a notch 35 formed for engagement with the upper hood ridge member 41. The air box 1 is provided with a flange 1c for connection with the air-box socket 19 and a joint surface to be piled on an air-box joint flange 2.

10 Claims, 8 Drawing Sheets

VEHICLE BODY STRUCTURE

BACKGROUND OF THE INVENTION

1. Field of the Invention

The present invention relates to a vehicle body structure. More particularly, it relates to the body structure in the circumference of an air box of the vehicle body.

2. Description of Related Art

As the earlier art body structure in the circumference of the air box in a vehicle, Japanese Patent Publication (kokai) No. 6-329051 discloses one body structure where the air box is connected with both of a front pillar and a hood ridge on one side of the vehicle body.

In detail, the air box is arranged so as to extend along the direction of a vehicle's width, forming an automotive framework member. The above front pillar is arranged on each end of the air box in the vehicle's width direction. Each front pillar is arranged to extend along the upward-and-downward direction of the vehicle body, also forming one automotive framework member. The hood ridge is arranged on each side of the vehicle body, in its front section. On each side of the vehicle body, the hood ridge is arranged to extend along the fore-and-aft direction of the vehicle body, also forming one automotive framework member.

The air box is provided, on each side in the width direction, with a horizontal flange. On the other hand, the hood ridge has a joint surface defined for integration with the air box. In assembling, the above horizontal flange of the air box is piled on the joint surface defined on the hood ridge. Successively, the flange is connected to the joint surface by welding. Besides the joint surface, the hood ridge has a lateral flange formed to project from its sidewall sideways. While, the front pillar has a flange formed to project from its sidewall sideways, for abutment with the lateral flange of the hood ridge. In order to connect the front pillar with the hood ridge on each side of the vehicle body, the lateral flange of the hood ridge is butted against the flange of the front pillar and successively welded to the same flange into one body.

However, the above-mentioned body structure has a problem to be solved.

That is, if an external force via an automotive suspension in the upward-and-downward direction, so-called "suspension input" is applied on the hood ridge, the resultant bending of the hood ridge allows a force to act on the above connections between the air box and the hood ridge and between the hood ridge and the front pillar in a direction to separate the horizontal flange of the air box from the joint surface of the hood ridge and separate the lateral flange of the hood ridge from the flange of the front pillar. In order to avoid the occurrence of separations, it is necessary to enhance the bending rigidity of the hood ridge, for example, by increasing a plate thickness of each constituent of the structure. However, such an increase in plate thickness causes the body structure to be heavy-weighted as a matter of course.

Meanwhile, in view of reducing the weight of a vehicle body and the number of its components, there is a vehicle body on recent development, which is made of a casting of light metal, for example, aluminum alloy, manganese alloy, etc.

In spite of the attempt for lightweight, the above-mentioned conventional body structure still causes the plate thickness to be increased in view of ensuring the bending rigidity of each hood ridge. In other words, there is still remained a limit for the light-weighted body structure due to such an increase in plate thickness.

SUMMARY OF THE INVENTION

Under the above circumstance, it is an object of the present invention to provide a body structure in the circumference of an air box, by which the vehicle body can be light-weighted furthermore.

According to the invention, the above-mentioned object is accomplished by a vehicle body structure, comprising:

an air box arranged near front pillars of the vehicle to extend along a width direction of the vehicle;

front-pillar inner members arranged on both sides of the air box in the width direction, each front-pillar inner member extending along an upward-and-downward direction of the vehicle;

front-pillar outer members arranged on both sides of the air box in the direction of the vehicle's width, each front-pillar outer member extending along the upward-and-downward direction of the vehicle; and hood ridges arranged on both sides of the air box in the direction of the vehicle's width, each hood ridge having a upper hood ridge member formed to extend along a fore-and-aft direction of the vehicle.

In the vehicle body structure, the front-pillar inner member has a pillar-inner vertical wall formed generally along the fore-and-aft direction of the vehicle, an air-box socket formed inside the pillar-inner vertical wall in the width direction to receive the air box from its underside, and an air-box joint flange formed on the upper part of the front-pillar inner member to join it to the air box. The upper hood ridge member has a fore-and-aft-directional vertical wall formed with an opening for joint so as to extend in the fore-and-aft direction and also along the pillar-inner vertical wall's surface being outside in the direction of the vehicle's width, and a width-directional vertical wall formed at a rear part of the upper hood ridge member to extend along the direction of the vehicle's width. The front-pillar outer member has a notch formed for engagement with the rear part of the upper hood ridge member. The air box is provided with a flange to be joined to the air-box socket of the front-pillar inner member and a joint surface to be piled on the air-box joint flange. In the structure, the air box, the front-pillar inner members, the front-pillar outer members and the hood ridges are joined together.

BRIEF DESCRIPTION OF THE DRAWINGS

FIGS. 10A, 10B and 10C are respective views showing various rapping directions for the hood-ridge member, in which

DESCRIPTION OF THE PREFERRED EMBODIMENT

FIGS. 1 to 7 illustrate the first embodiment of the present invention.

Figure 1:
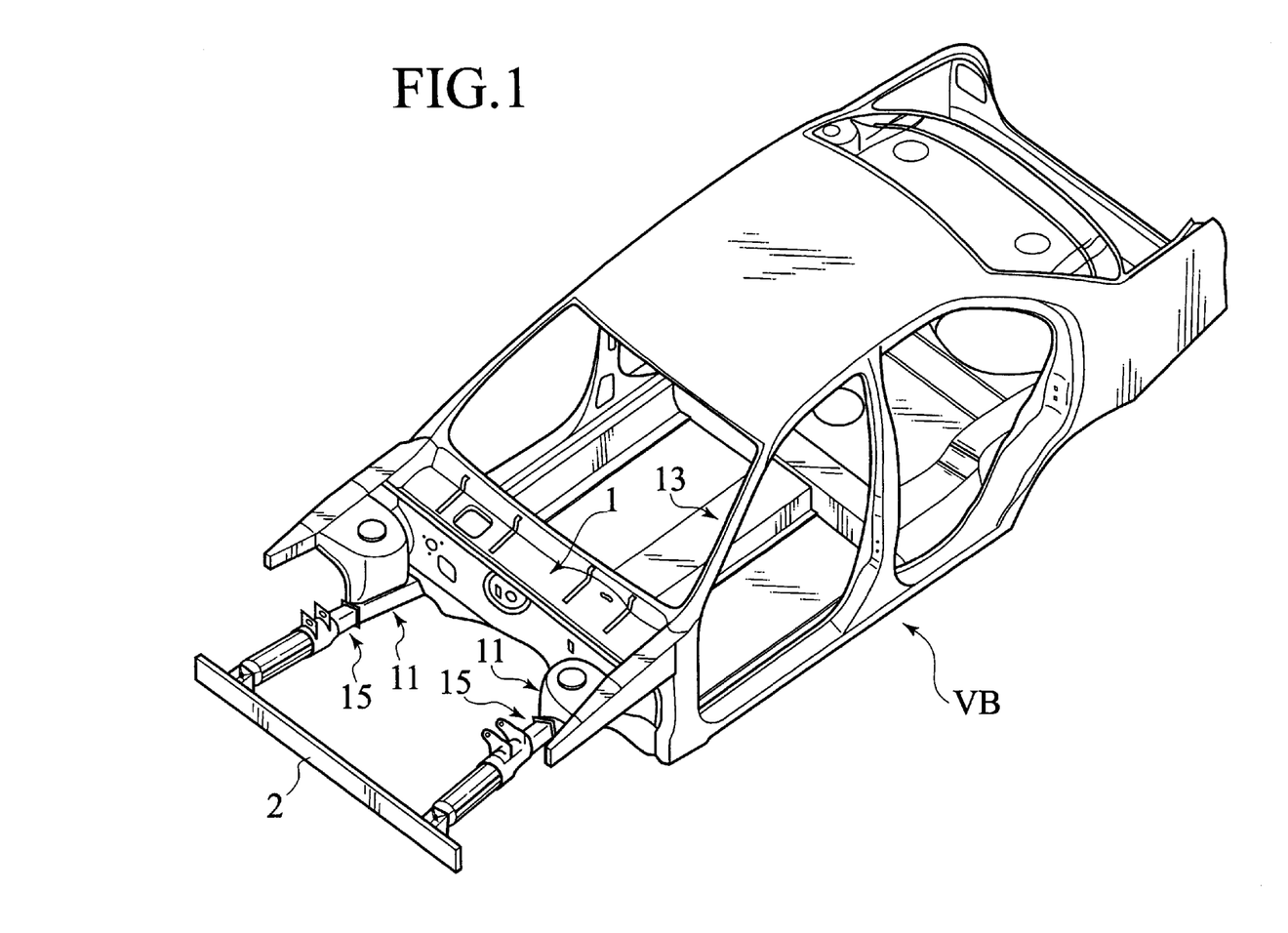
FIG. 1 is a perspective view of the overall outward appearance of a vehicle body to which the present invention is to be applied.
Figure 2:
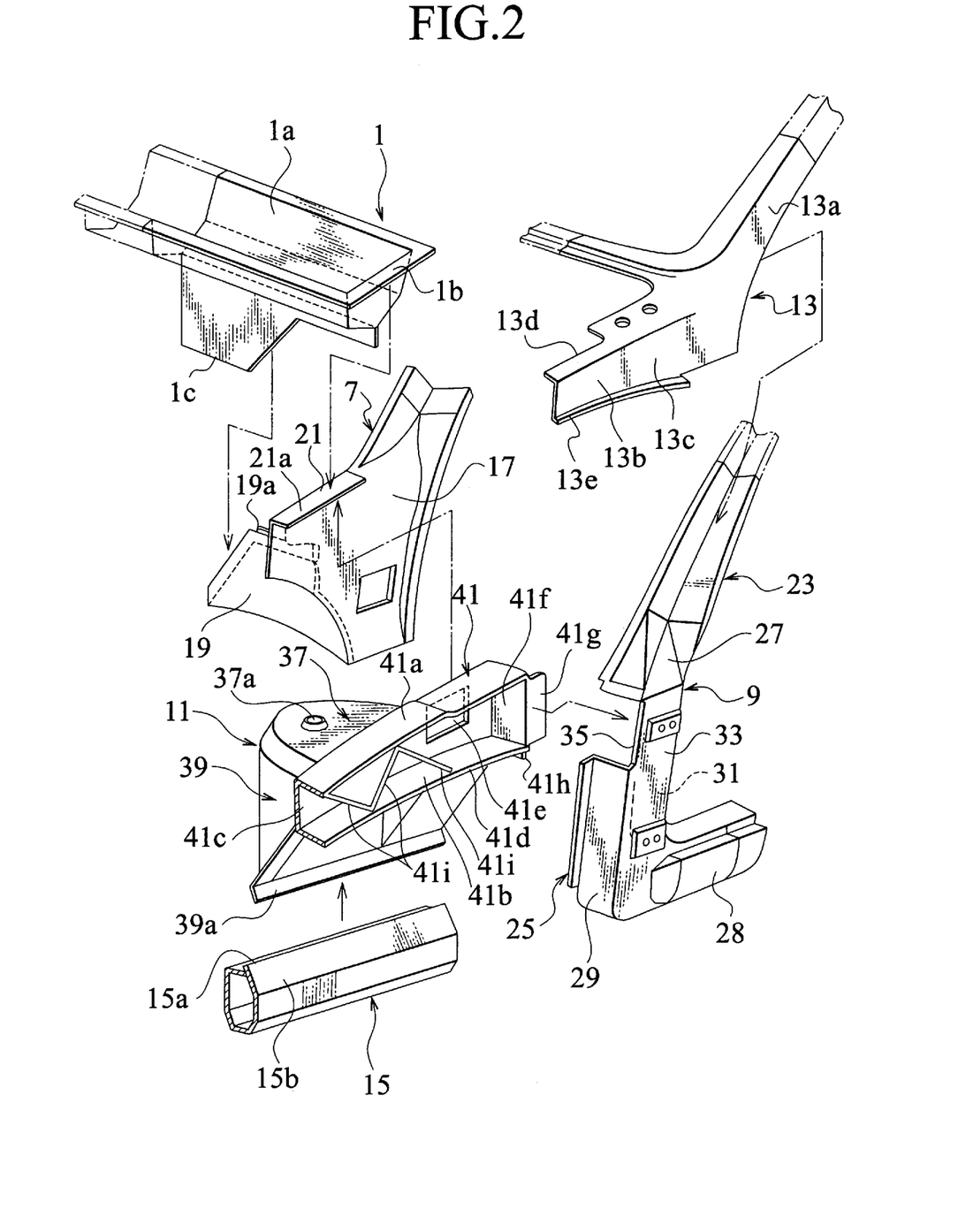
FIG. 2 is an exploded perspective view of a vehicle body structure in accordance with one embodiment of the invention.

In these figures, FIG. 1 illustrates a vehicle body VB equipped with a body structure in accordance with an embodiment of the invention. FIG. 2 is an exploded perspective view of the body structure in the circumference of an air box in the vehicle body VB. As shown in the figure, the vehicle body structure mainly comprises an air box 1, an inner member 7 to be joined to the air box 1 to form a front pillar, an outer member 9 also forming the front pillar together with the inner member 7 and a hood ridge 11 to be joined to the outer member 9 and the inner member 7. Note, the inner member 7 and the outer member 9 will be referred as "front-pillar inner member 7" and "front-pillar outer member 9", respectively Reference numeral 13 designates a roof structure to be joined to the front-pillar outer member 9. Reference numeral 15 denotes a front side member to be connected with the hood ridge 11. As shown in FIG. 1, the above constituents of the vehicle body structure and the front side member 15 are arranged on each side of the vehicle body VB in a direction of the body's width, besides the air box 1. Therefore, although the vehicle body VB is provided, on both sides thereof, with two body structure, the embodiment of the invention will be described with reference to one body structure on one side of the vehicle body VB. Note that both front ends of the front side members 15 are respectively connected to a cross member 2 which extends in the direction of the body's width. This direction will be referred as "vehicle's width direction", below.

In the embodiment, the front-pillar inner member 7, the front-pillar outer member 9 and the hood ridge 11 are made of casings of light metal, for example, aluminum alloy, manganese alloy, etc. While, the air box 1 may be made from plate materials of the same light metal. The roof structure 13 is made of a casing of the same light metal. The front side member 15 is made of an extrusion of the same light metal. In this way, since the whole vehicle body is made of the light metal, the light-weightiness can be progressed from a point of view of materials remarkably.

The air box 1, which is a framework member disposed in the vehicle's width direction, has a wall 1a formed to extend along the above direction. On one side of the air box 1 in the vehicle's width direction, a horizontal flange 1b is formed to project from the end of the box 1 laterally. The horizontal flange 1b is provided, on its under side, with a joint surface with the front-pillar inner member 7. On the lowermost part of the air box 1, a vertical flange 1c is formed so as to project further downward.

The front-pillar inner member 7 has a "pillar-inner" vertical wall 17 formed to extend along a fore-and-aft direction of the vehicle. Inside of the vertical wall 17 in the vehicle's width direction, an "air-box" socket 19 for receiving the air box 1 is formed to project inward of the vehicle's width direction. The air-box socket 19 is provided with a socket part 19a in the form of a groove for receiving the flange 1c. At the top of the member 7, it has a flange 21 for connecting the member 7 with the air box 1. This flange 21 is formed so as to project outward of the vehicle's width direction while directing its joint surface 21a upward.

The front-pillar outer member 9 has an upper part 23 and a lower part 25. The upper part 23 is formed to succeed the lower part 25 through an inflecting part 27, forming an inside structure of the vehicle body. A side sill 28 is formed to succeed the lower part 25. The lower part 25 generally comprises a front vertical wall 29 extending along the vehicle's width direction, a rear vertical wall 31 also extending along the vehicle's width direction and an outer vertical wall 33 extending along the vehicle's fore-and-aft direction. The front vertical wall 29 is provided, on an upper part thereof, with a notch 35.

The hood ridge 11 includes a suspension attachment member (part) 37, a housing member (part) 39 and a upper hood ridge member (part) 41, all of which are formed into one casing body of light metal. Thus, in comparison with the arrangement where these elements are made of plate materials and welded into one body, the hood ridge 11 of the embodiment allows the number of components to be reduced, thereby facilitating the production. The suspension attachment member 37 is an element to be attached to a suspension (not shown) allowing a wheel to carry the vehicle body VB. The suspension attachment member 37 is provided, at a top face thereof, with a suspension attachment hole 37a for attachment with the suspension. In assembling, the housing member 39 has an upper portion joined to the suspension attachment member 37. The housing member 39 further includes a flange 39a formed on its lower portion, for connection with the front side member 15 which forms one of lower frameworks of the vehicle body VB. The upper hood ridge member 41 is integrally joined to an upper portion of the housing member 39 outside of the vehicle's width direction and also formed so as to lengthen in the vehicle's fore-and-aft direction, forming the framework of the vehicle body. The upper hood ridge member 41 comprises an upper wall 41a, a lower wall 41b and a "fore-and-aft-directional" vertical wall 41c connecting the upper wall 41a with the lower wall 41b, providing a substantial U-shaped cross section. The lower wall 41b is formed somewhat longer than the upper wall 41a in the vehicle's width direction, thereby providing a joint flange 41d. The vertical wall 41c is provided with a joint opening 41e. The rear end of the upper hood ridge member 41 is blocked up with a "width-directional" vertical wall 41f extending along the vehicle's width direction. The vertical wall 41f has a joint flange 41g arranged outside of the vehicle's width direction. On the lowermost end of the vertical wall 41f, a vertical wall 41h is formed so as to extend along the vehicle's width direction. Inside the so-constructed upper hood ridge member 41, a plurality of reinforcement ribs 41i are formed so as to extend along the vehicle's width direction. These ribs 41i are provided to connect the upper wall 41a, the lower wall 41b and also the vertical wall 41c with each other.

The front side member 15 connected with the underside of the hood ridge 11 forms the lower framework of the vehicle body VB and extends along the vehicle's fore-and-aft direction, which is similar to the upper hood ridge member 41. At an upper corner of the front side member 15 outside of the vehicle's width direction, a joint flange 15a is formed so as to project obliquely upward, but inward of the vehicle's width direction. Further, the front side member 15 has a similarly-inclined joint surface 15b formed to succeed to the joint flange 15a.

Figure 3:
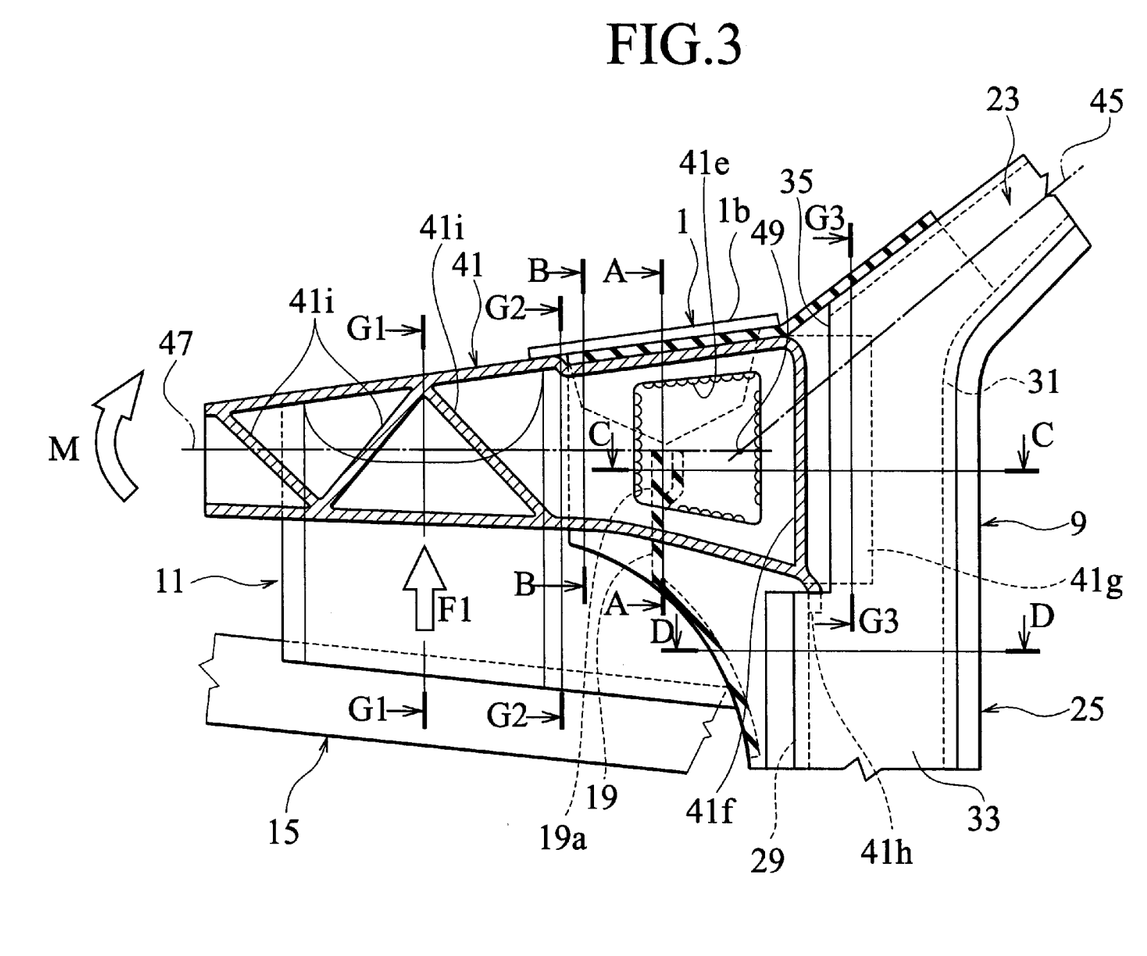
FIG. 3 is a partially-omitted side view of the assembled vehicle body structure of the embodiment, also viewed from the outside in the direction of a vehicle's width.
Figure 4:
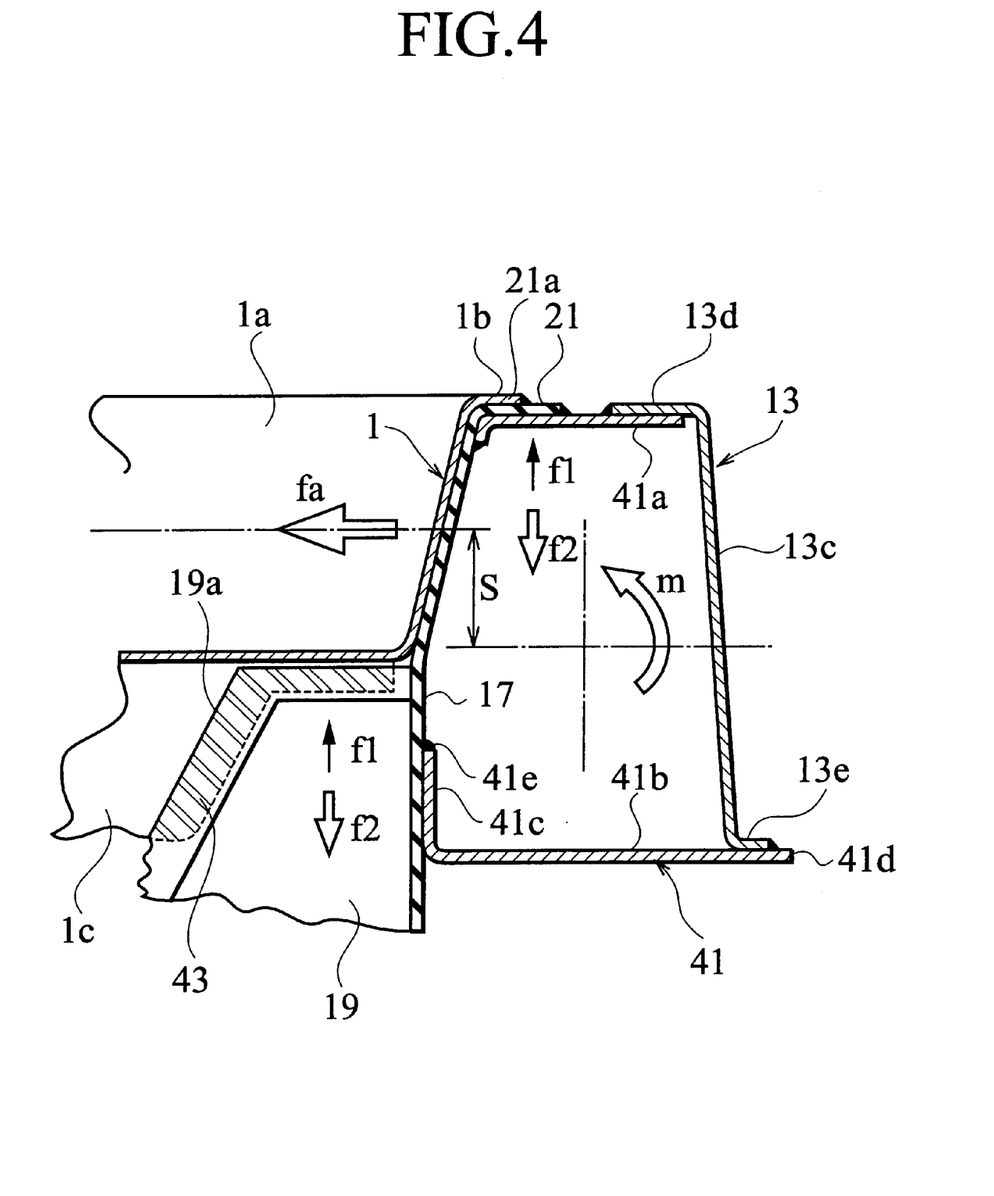
FIG. 4 is a sectional view taken along a line A—A of FIG. 3.
Figure 5:
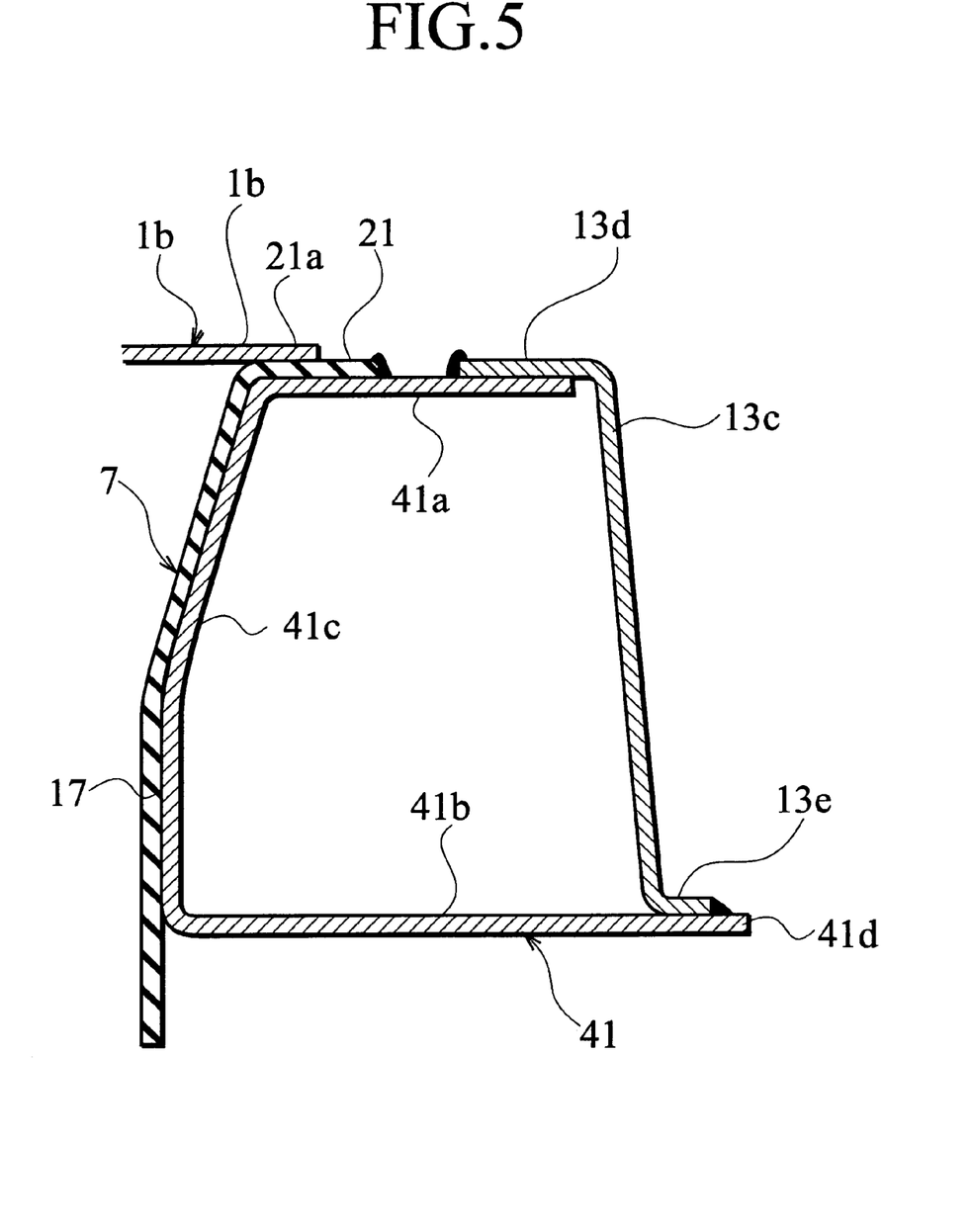
FIG. 5 is a sectional view taken along a line B—B of FIG. 3.

The roof structure 13 has a front-pillar outer part 13a formed to fit with an external face of the upper part 23 of the front-pillar outer member 9. This front-pillar outer part 13a also forms a panel that extends from the roof, along an external surface of a front pillar of the vehicle. This front-pillar outer part 13a is combined with the upper part 23 of the front-pillar outer member 9 so as to define one closed-sectional structure. The lower end of the roof structure 13 is further elongated to define a joint wall 13b. The joint wall 13 has a vertical wall 13c, an upper flange 13d and a lower flange 13e. FIG. 3 is a partially-omitted side view of the assembly. In the assembly, the air box 1, the front-pillar inner member 7, the front-pillar outer member 9, the hood ridge 11, the roof structure 13 and the front side member 15 are joined together. FIGS. 4 to 7 show respective sections of the above assembly. That is, FIG. 4 is a sectional view taken along a line A—A of FIG. 3. FIG. 5 is a sectional view taken along a line B—B and FIG. 6 a sectional view taken along a line C—C. FIG. 7 is a sectional view taken along a line D—D of FIG. 3.

As shown in FIGS. 2 and 3, the rear part of the upper hood ridge member 41 is fitted into the notch 35 of the front-pillar outer member 9 and the vertical wall 41g is united with the outer vertical wall 33. In detail, the circumference of the notch 35 is welded to the vertical wall 41g, while the vertical wall 41g is welded to an inside face of the outer vertical wall 33. Further, the lower vertical wall 41h is brought into surface contact with an inside face of the front vertical wall 29 and joined thereto by welding. In this state, the vertical wall 41f of the upper hood ridge member 41 occupies a position substantially identical to a position of the vertical wall 29 in the fore-and-aft direction of the vehicle.

As shown in FIGS. 3 to 5, the vertical wall 41c of the upper hood-ridge part 41 is butted against the outer face of the vertical wall 17 of the front-pillar inner member 7. While, the joint flange 21 of the member 7 is joined to the upper wall's portion (41a) fallen a degree. In this state, the circumference of the opening 41e is welded to the vertical wall 17 and the joint flange 21 of the member 7 is welded to the upper wall 41a of the upper hood ridge member 41.

The horizontal flange 1b of the air box 1 is piled on the joint surface 21a of the joint flange 21 and subsequently, the former is joined to the latter by welding. The other flange 1c of the air box 1 is inserted into the groove 19a of the socket 19 of the member 7 and joined thereto by adhering. In FIG. 4, an area 43 shown with doubly-slanted lines forms an adhering face defined along the up-and down direction of the vehicle.

As shown in FIGS. 3 to 5, the front-pillar outer part 13a of the roof structure 13 is welded to the upper part 23 of the front-pillar outer member 9. Similarly, the vertical wall 13c of the structure 13 is laid and welded to the outward opening of the upper hood ridge member 41, while the joint flange 13d is laid and welded to the upper wall 41a of the part 41. The lowermost joint flange 13e is piled on the joint flange 41d of the upper hood ridge member 41 from the upside and welded to the flange 41d.

Figure 6:
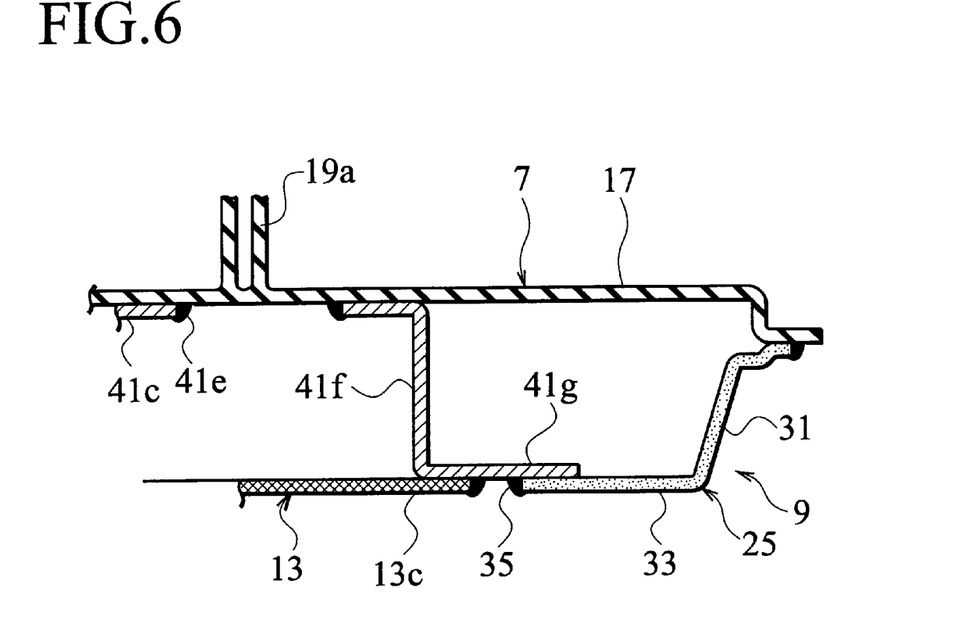
FIG. 6 is a sectional view taken along a line C—C of FIG. 3.
Figure 7:
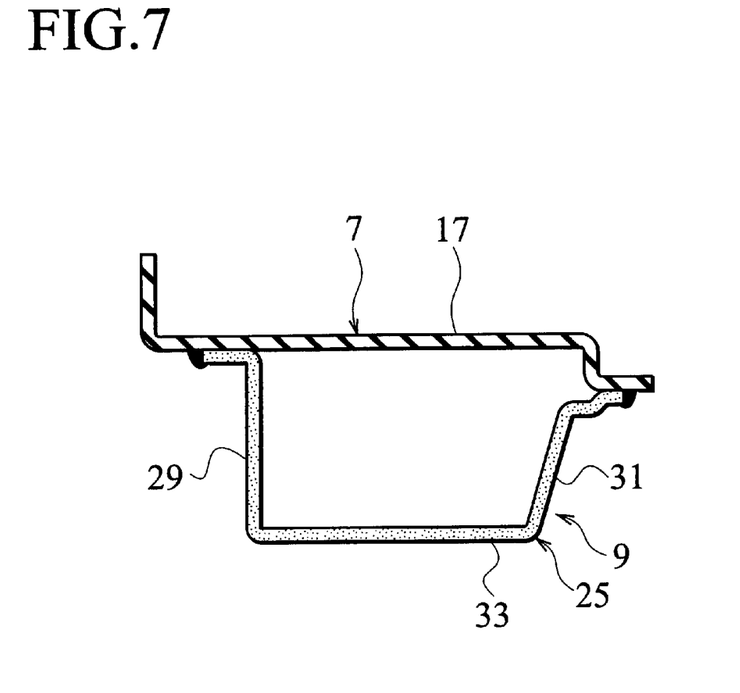
FIG. 7 is a sectional view taken along a line D—D of FIG. 3.

As shown in FIGS. 3, 6 and 7, the lower part 25 of the outer pillar member 9 is welded to the vertical wall 17 of the front-pillar inner member 7. Similarly, the rear portion of the vertical wall 17 of the roof structure 13 is connected with the vertical wall 41g of the upper hood ridge member 41 by welding.

The vertical wall 17 of the front-pillar inner member 7 is also welded to the rear side of the housing member 39 of the hood ridge 11. The joint flange 15a and the joint face 15b of the front side member 15 are butted on the joint flange 39a at the lowermost end of the hood ridge 11 in plane and welded into one body.

Under the above condition, as shown in FIG. 3, the air box 1 is positioned on the front-and-upper side of a point 49. At the point 49, a line 45 intersects with another line 47. The line 45 extends along the upper part of the front-pillar outer part 9 and also passes through its center in the direction of its width. While, the line 47 extends along the hood ridge 11 in the fore-and-aft direction and also passes through its center of the upward-and-downward direction. Further, as shown in FIG. 4, the air box 1 is arranged so that its center of the upward-and-downward direction shifts from the center of the upper hood ridge member 41 of the upward-and-downward direction, upward at a distance S.

In the so-assembled structure, the rear part of the part 41 is welded to the vertical wall 17 of the inner member 7 and the vertical wall 33 of the outer member 9 with shear surfaces. As shown in FIG. 3, if the structure is loaded by a suspension input F1 to apply a moment M on the upper hood ridge member 41, then the force of the moment M is transmitted to the front pillar having high welding strength, through the shear surfaces. Thus, the above force is transmitted from the front pillar to the framework members, such as a roof rail, certainly.

Repeatedly, the upper hood ridge member 41 is joined to the joint flange 21 of the inner member 7 and the vertical wall 41h is also joined to the vertical wall 29, in respective surface contacts. Thus, the so-completed joint structure allows the suspension input of the upward-and-downward direction to be transmitted from the part 41 to the outer member 9 and the inner member 7 through the surface contacts, thereby distributing the force to the overall framework members certainly.

As to the twisting of the vehicle body caused by the suspension input etc., the socket 19 of the inner member 7 bears twisting forces f1, f2 through the part 41 (FIG. 4) in the fore-and-aft direction of the vehicle body. Consequently, the socket part 19a comes into surface contact with the joint flange 1c. Additionally, since the joint flange 21 comes into surface contact with the horizontal flange 1b of the air box 1 in the upward-and-downward direction, the above forces are transmitted to the opposite side of the vehicle's width direction, through the air box 1. Then, the forces are dispersed to the overall framework members through the opposite front pillar.

As the vertical wall 13c of the roof structure 13 covers the opening of the upper hood ridge member 41 to define the closed section, the twisting rigidity of the part 41 is enhanced to enable its wall thickness to be reduced. According to such the structure, it is possible to improve the load-transmitting function while reducing the weight of the body structure.

The vertical wall 41f of the upper hood ridge member 41 and the vertical wall 29 of the front-pillar outer member 9 are substantially equal to each other in terms of position of the fore-and-aft direction of the vehicle. Therefore, the periphery of the wall 41f can butt against the vertical wall 29 of the outer member 9 or the inner periphery of the notch 35 close to the wall 29. Consequently, the twisting force on the part 41 can be transmitted from the circumference of the vertical wall 41f to the front pillar via the vertical wall 29 of the outer member 9 or the inner periphery of the notch 35, thereby transmitting the twisting force to the overall framework members through the front pillar.

Since the air box's center of the upward-and-downward direction shifts from the same directional center of the upper hood ridge member 41 upward at the distance S, the twisting input m (FIG. 4) of the part 41 acts as a compressive force fa, so that it can be transmitted to the opposite side of the vehicle's width direction through the whole wall 1a of the air box 1. Owing to such the load transmission, it is possible to transmit the force to the overall framework members through the opposite front pillar more certainly.

As shown in FIG. 4, since the socket part 19a of the socket 19 of the inner member 7 adheres to the joint flange 1c through the adhering face 43 along the upward-and-downward direction, such the joint allows the same-directional force to be received by a shear force having a high adhering strength, whereby the suspension input can be transmitted from the inner member 7 to the air box 1 through the adhering face 43 and subsequently, from the air box 1 to the overall framework members through the front pillars on both sides of the box 1, more certainly.

Repeatedly, note that the air box 1 is positioned on the front-and-upper side of the point 49 where the line 45 extending along the upper part of the front-pillar outer part 9 and also passing through its center in the direction of its width intersects with the line 47 extending along the hood ridge 11 in the fore-and-aft direction and also passing through its center of the upward-and-downward direction. Additionally, on each side of the vehicle, the front-pillar inner member 7, the hood ridge 11 and the front-pillar outer member 9 are all made of castings of light metal, while the air box 1 is made of plate materials of light metal. Consequently, the air box 1 can be utilized as one bending member making the best use of feature of the plate materials with great stretches. Thus, the suspension input can be received by the air box 1 as a bending force to be applied thereon, so that the force is transmitted to the opposite side of the vehicle body in the vehicle's width direction. Not only for the opposite side, but also for the overall framework members, more certainly.

According to the embodiment, since the suspension input can be transmitted to the overall framework members effectively, it is possible to complete the load transmission without increasing the wall thickness of the structure. Further, owing to the formation of the body structure of light metals, the reduction in weight can be progressed. Again, owing to the adoption of castings etc. of light metal, the reduction in number of components can be progressed, too.

Figure 8:
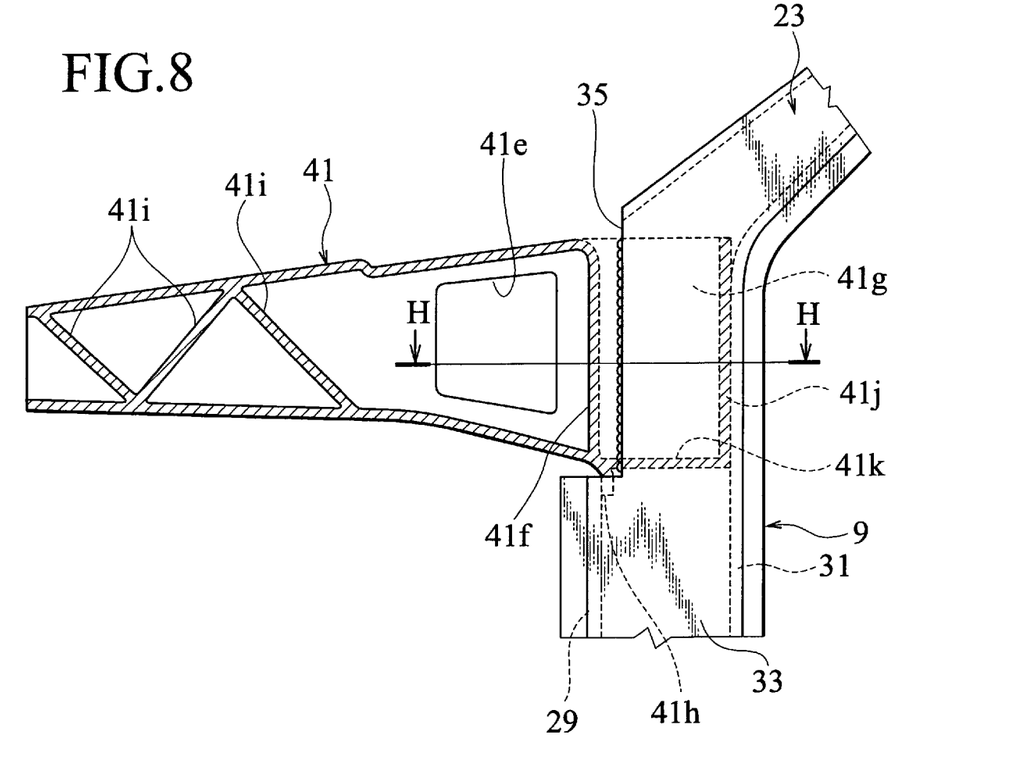
FIG. 8 is a partially-omitted side view of the vehicle body structure in the modification of the invention, also viewed from the outside in the direction of a vehicle's width.
Figure 9:
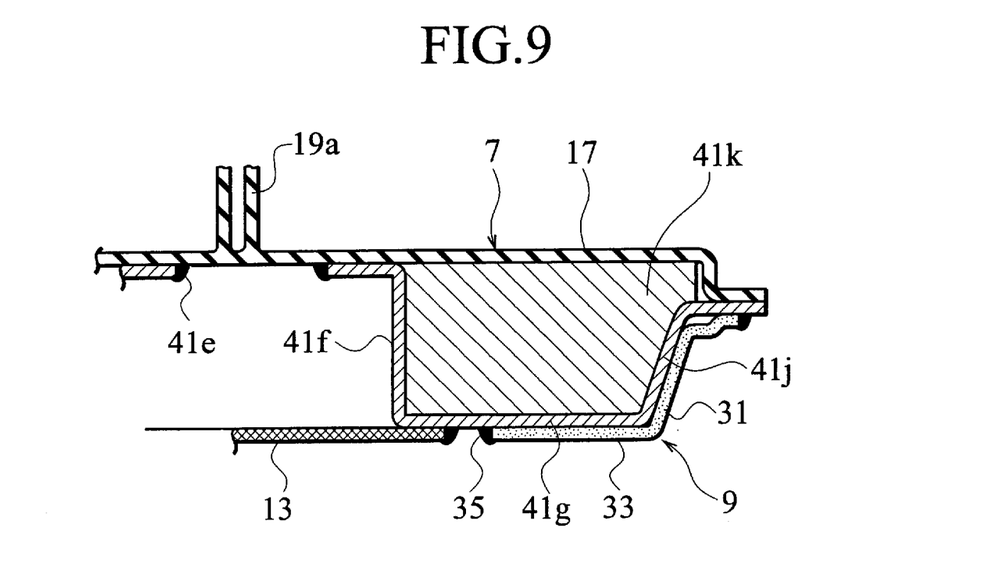
FIG. 9 is a sectional view taken along a line H—H of FIG. 8.

FIGS. 8 and 9 show another embodiment in connection with the modification of the first embodiment of the invention. Note constituents corresponding to those of the first embodiment are indicated with the same reference numerals respectively and their overlapping descriptions are eliminated. In these figures, there are mainly shown the upper hood ridge member 41 and the front-pillar outer member 9. FIG. 8 shows a side view of the embodiment, similar to FIG. 3. FIG. 9 is a sectional view taken along a line H—H of FIG. 8.

In this embodiment, the rear vertical wall 41g of the part 41 is extended to form an extension vertical wall 41j which is joined to the rear vertical wall 31 of the front-pillar outer member 9 along the vehicle's width direction. With the structure, in spite of the twisting or bending of the part 41, the extended rear vertical wall 41g can butt against the whole inner face of the vertical wall 33, while the wall 41j can butt against the whole vertical wall 31.

Accordingly, the up-and-down input (force) transmitted from the suspension can be transmitted to the front-pillar through a shear zone between the vertical wall 41g and the inner face of the vertical wall 33 and a plane contact between the vertical wall 41j and the rear vertical wall 31. Subsequently, the so-transmitted input can be further transmitted from the front pillar to the whole framework members of the vehicle body. Further, the twisting force of the upper hood ridge member 41 can be transmitted to the front pillar through the surface contact between the vertical wall 41g and the vertical wall 33 and the surface contact between the extension vertical wall 41j and the rear vertical wall 31. Subsequently, the so-transmitted twisting force can be further transmitted from the front pillar to the whole framework members more certainly.

Additionally, owing to the provision of a horizontal wall 41k connecting the vertical wall 41f to the vertical walls 41g and 41j, it is possible to improve the rigidity of the upper hood ridge member 41. Therefore, it is possible to complete both shear and surface contact between the rear vertical wall 41g and the vertical wall 33 of the front-pillar outer member 9 and the surface contact between the vertical wall 41j and the vertical wall 31. Further, owing to the contribution on force transmission of the horizontal wall 41k, it is possible to perform the force transmission on the whole framework members more certainly.

Figure 10A:
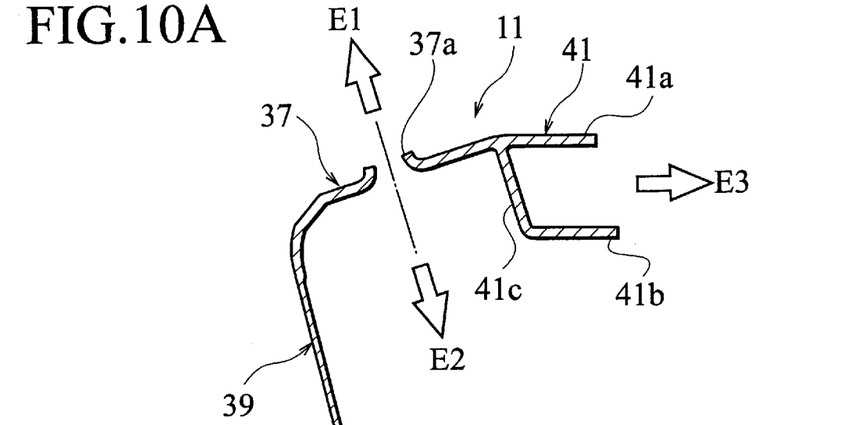
FIG. 10A is a sectional view taken along a line G1—G1 of FIG. 3.
Figure 10B:
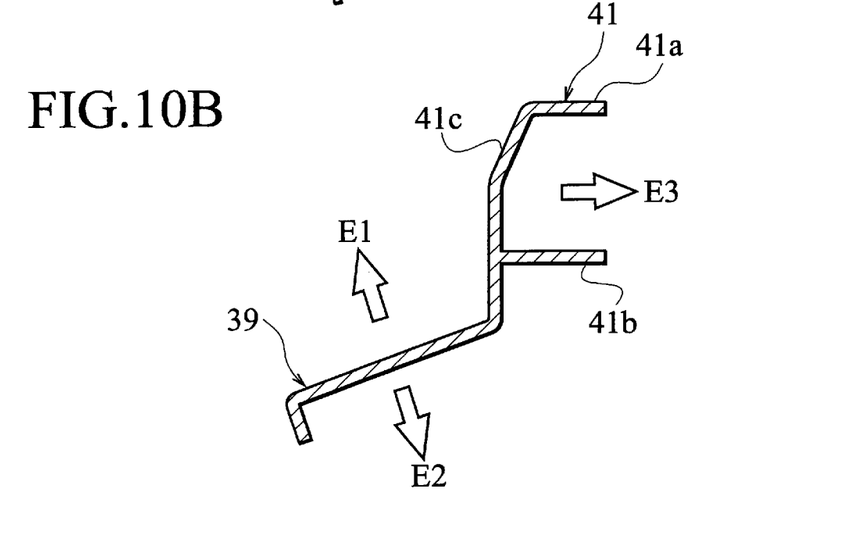
FIG. 10B is a sectional view taken along a line G2—G2 of FIG. 3.
Figure 10C:
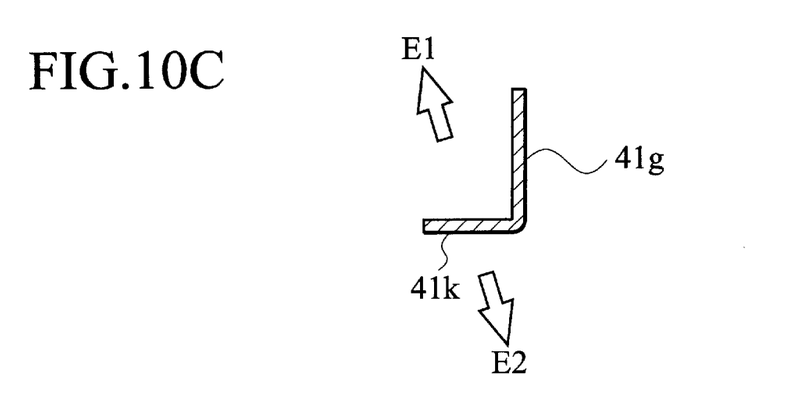
FIG. 10C is a sectional view taken along a line G3—G3 of FIG. 3.

We now explain a rapping direction in case of forming the hood ridge 11 by a casting of light metal. In the related figures, FIG. 10A is a sectional view taken along a line G1—G1 of FIG. 3, FIG. 10B a sectional view taken along a line G2—G2 of FIG. 3 and FIG. 10C is a sectional view taken along a line G3—G3 of FIG. 3.

In common with the shown examples, main dies for molding the suspension attachment member 37 are withdrawn along directions E1 and E2, while a molding die for the upper hood ridge member 41 is withdrawn along a direction E3. By such the rapping, it is possible to form the hood ridge 11 in one body with ease.

Although the respective parts are made of light metals, for example, aluminum alloy, manganese alloy, etc. in common with the above-mentioned embodiments, the above metals, may be replaced with other light metals or other materials, of course.

Also in such a case, it is possible to restrict the increasing in both wall-thickness and weight of the body structure while maintaining the effective transmission of loads.

The entire contents of Japanese Patent Application No. 11-264563 (filed on Sep. 17, 1999) is incorporated by reference herein.

The scope of the invention is defined with reference to the following claims.

What is claimed is:

1. A vehicle body structure, comprising:
   an air box arranged near front pillars of the vehicle to extend along a width direction of the vehicle;
   front-pillar inner members arranged on both sides of the air box in the width direction, each front-pillar inner member extending along an upward-and-downward direction of the vehicle;
   front-pillar outer members arranged on both sides of the air box in the direction of the vehicle's width, each front-pillar outer member extending along the upward-and-downward direction of the vehicle; and
   hood ridges arranged on both sides of the air box in the direction of the vehicle's width, each hood ridge having a upper hood ridge member formed to extend along a fore-and-aft direction of the vehicle; wherein
   the front-pillar inner member has a pillar-inner vertical wall formed generally along the fore-and-aft direction of the vehicle, an air-box socket formed inside the pillar-inner vertical wall in the width direction to receive the air box from its underside, and an air-box joint flange formed on the upper part of the front-pillar inner member to join it to the air box;

the upper hood ridge member has a fore-and-aft directional vertical wall formed with an opening for joint so as to extend along the fore-and-aft direction and also along the pillar-inner vertical wall's surface being outside of the direction of the vehicle's width, and a width-directional vertical wall formed at a rear part of the upper hood ridge member to extend along the direction of the vehicle's width;

the front-pillar outer member has a notch formed for engagement with the rear part of the upper hood ridge member;

the air box is provided with a flange to be joined to the air-box socket of the front-pillar inner member and a joint surface to be piled on the air-box joint flange; and the air box, the front-pillar inner members, the front-pillar outer members and the hood ridges are joined together.

2. The vehicle body structure of claim 1, wherein the upper hood ridge member has a rear vertical wall formed at an outer edge of the width-directional vertical wall along the fore-and-aft direction of the vehicle; and the rear vertical wall is joined to a fore-and-aft-directional vertical wall formed on the front-pillar outer member along the fore-and-aft direction of the vehicle.

3. The vehicle body structure of claim 2, wherein the width-directional vertical wall of the upper hood ridge member is elongated to provide an extension vertical wall extending along the direction of the vehicle's width; and the extension vertical wall is joined to a width-directional vertical wall formed on the front-pillar outer member along the direction of the vehicle's width.

4. The vehicle body structure of claim 3, wherein the width-directional vertical wall, the rear vertical wall and the extension vertical wall are joined to each other through a hood-ridge lateral wall formed on the rear side of the upper hood ridge member.

5. The vehicle body structure of claim 1, wherein a roof structure forming the vehicle roof is partially joined to the rear portion of the upper hood ridge member, thereby defining a closed sectional structure.

6. The vehicle body structure of claim 5, wherein the width-directional vertical wall of the upper hood ridge member and the width-directional vertical wall of the front-pillar outer member are respectively arranged in positions substantially identical to each other, in the fore-and-aft direction of the vehicle.

7. The vehicle body structure of claim 6, wherein the air box is arranged so that its center in the up-and-down direction of the vehicle is on the upside of the center of the upper hood ridge member in the up-and-down direction.

8. The vehicle body structure of claim 7, wherein the air-box socket of the front-pillar inner member and the air-box joint flange of the air box are respectively provided with adhering surfaces along of the vehicle; and the adhering surfaces are adhered to each other.

9. The vehicle body structure of claim 8, wherein at least the front-pillar inner member, the hood ridge and the front-pillar outer member are made of castings of light metal.

10. The vehicle body structure of claim 9, wherein the air box is positioned on the front-and-upper side of a point where a line extending along the upper part of the front-pillar outer member and also passing through its center in the direction of its width intersects with another line extending along the hood ridge in the fore-and-aft direction and also passing through its center of the upward-and-downward direction; and the front-pillar inner member, the hood ridge and the front-pillar outer member are made of castings of light metal, while the air box is made of plate materials of light metal.

* * * * *

UNITED STATES PATENT AND TRADEMARK OFFICE
µCERTIFICATE OF CORRECTION

PATENT NO. : 6,209,950 B1
DATED : April 3, 2001
INVENTOR(S) : Atsushi Hanyu

It is certified that error appears in the above-identified patent and that said Letters Patent is hereby corrected as shown below:

<u>Title page,</u>
Item [30], Foreign Application Priority Data", change "P11-264463" to
-- P11-264563 --.

Signed and Sealed this

Thirtieth Day of October, 2001

*Attest:*

*Nicholas P. Godici*

*Attesting Officer*

NICHOLAS P. GODICI
*Acting Director of the United States Patent and Trademark Office*